(12) United States Patent
Hoeing

(10) Patent No.: US 7,772,037 B2
(45) Date of Patent: Aug. 10, 2010

(54) METHOD FOR PRODUCING A MULTILAYER SYSTEM ON A CARRIER, IN PARTICULAR IN AN ELECTROCHROMIC ELEMENT

(75) Inventor: Thomas Hoeing, Cham (DE)

(73) Assignee: Flabeg GmbH & Co. KG, Fuerth (DE)

( * ) Notice: Subject to any disclaimer, the term of this patent is extended or adjusted under 35 U.S.C. 154(b) by 570 days.

(21) Appl. No.: 11/733,849

(22) Filed: Apr. 11, 2007

(65) Prior Publication Data
US 2007/0237898 A1    Oct. 11, 2007

(30) Foreign Application Priority Data
Apr. 11, 2006    (DE) .................... 10 2006 017 356

(51) Int. Cl.
*H01L 21/00* (2006.01)
(52) U.S. Cl. ................... 438/114; 438/115
(58) Field of Classification Search ........... 437/195, 437/238, 978; 438/114, 115, 692
See application file for complete search history.

(56) References Cited

U.S. PATENT DOCUMENTS

| | | | | |
|---|---|---|---|---|
| 5,936,295 | A * | 8/1999 | Havemann et al. | 257/522 |
| 6,727,588 | B1 * | 4/2004 | Abdelgadir et al. | 257/751 |
| 7,560,740 | B2 * | 7/2009 | Nagai et al. | 257/95 |
| 2002/0022378 | A1 * | 2/2002 | Baklanov et al. | 438/784 |
| 2007/0228369 | A1 * | 10/2007 | Suzuki et al. | 257/40 |

FOREIGN PATENT DOCUMENTS

| | | |
|---|---|---|
| DE | 2811472 | 9/1978 |
| DE | 19640515 | 4/1998 |
| DE | 69530424 | 1/2004 |
| WO | WO-9637809 | 11/1996 |

* cited by examiner

*Primary Examiner*—Timothy J Thompson
(74) *Attorney, Agent, or Firm*—Leydig, Voit & Mayer, Ltd.

(57) ABSTRACT

A method for producing a multilayer system on a substrate, wherein a first and a second layer are applied on the substrate, in each case by means of a vacuum coating process, provides adherence of the layers on each other, even if at least one of the layers of the multilayer system is porous. The layer applied first is, after its application and prior to the application of the other layer, partly removed again through an ion etching operation.

18 Claims, 1 Drawing Sheet

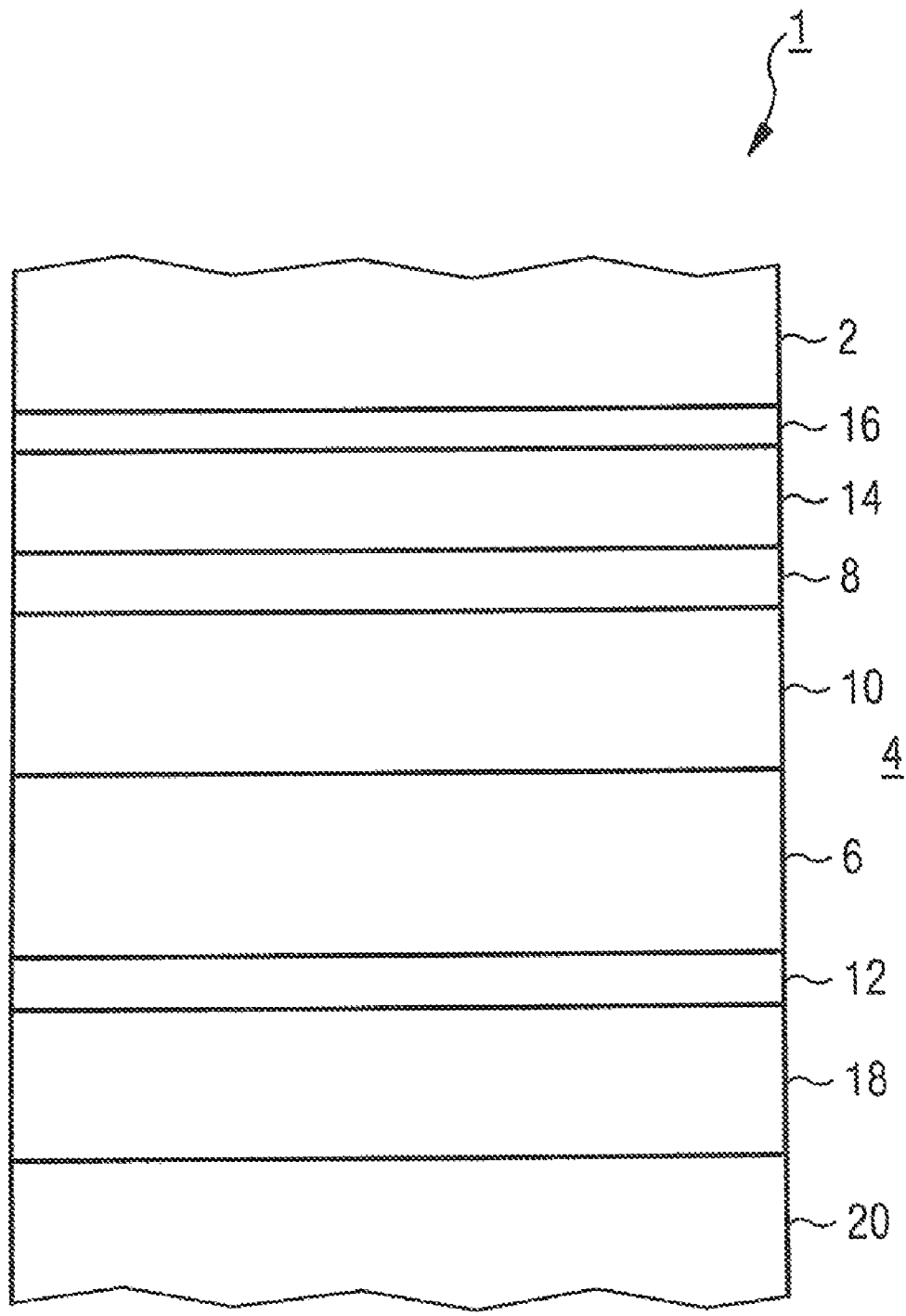

METHOD FOR PRODUCING A MULTILAYER SYSTEM ON A CARRIER, IN PARTICULAR IN AN ELECTROCHROMIC ELEMENT

Priority is claimed to German patent application No. DE 10 2006 017 356.2-51, filed on Apr. 11, 2006, the entire disclosure of which is incorporated by reference herein.

The present invention relates to a method for producing a multilayer system on a substrate, a first and a second layer being applied on the substrate, in each case through a—vacuum coating process. It relates in particular to a method for producing an electrochromic element with such a multilayer system, wherein the multilayer system is applied on a transparent substrate by means of a vacuum coating process and comprises an ion storage layer, a transparent solid-state electrolytic layer and an electrochromic layer.

BACKGROUND

Multilayer systems applied on a substrate or a carrier, usually consisting of a sequence of different functional and/or intermediate layers, can be used for a multitude of technical applications. For example, in such a construction, optical devices with variable transmission or reflection can be produced in which the reflectance or transmittance can be varied as a function of an applied voltage, making use of the phenomenon of an electrochemically induced spectroscopic change in a material, usually a change of color, also known as electrochromism.

The phenomenon of an electrochemically induced spectroscopic change in a material, usually a change of color, is usually called electrochromism. Making use of this phenomenon, for example optical devices with variable transmission or reflection can be produced in which the reflectance or transmittance can be varied as a function of an applied voltage.

In such electrochromic elements, an electrochromic material interacts with guest ions or electrodes introduced into the electrochromic material by applying an electric potential, the interaction of the electrochromic material being influenced by means of the incidence of electromagnetic radiation. Typical examples of such electrochromic materials are $WO_3$ and $MoO_3$, which, when applied in thin layers on a substrate, are almost colorless. If protons migrate into such a layer, for example in the case of tungsten oxide ($WO_3$), a reduction to blue tungsten bronze will take place, the intensity of the coloring being determined by the amount of the electrical charge flowing in the layer.

Electrochromic elements produced on the basis of this principle of electrochromism can be used in various devices in which a specific variability of the reflection or transmission characteristics is desirable. Such devices can be used, for example, in windows and canopy tops, in particular for motor vehicles. Such applications are, however, particularly advantageous for producing rearview mirrors with a low glaring effect for motor vehicles, because one problem of such rearview mirrors, which are usually designed for a particularly high reflectance in view of a good perceptibility in daylight, consists in the fact that at night, they can be very disturbing, in particular in view of a possible glare through following vehicles. Therefore, in view of the spectral distribution of the light emitted by the headlights of motor vehicles, an efficient antiglare behavior can be achieved in a particularly advantageous manner through an appropriate variation of the reflection characteristics of a rearview mirror by coating such a mirror with a suitably selected electrochromic material. In this case, on the one hand, a particularly high reflectance in daylight can be maintained, while in case of need, i.e. for example after a sensorically detected light incidence at night, the spectral reflection characteristics can specifically be modified by applying a control voltage, thus achieving an antiglare effect.

Especially in view of a possible use in vehicle rearview mirrors, it is desirable that such electrochromic elements achieve with relatively short switching times a particularly high so-called reflection stroke, namely the difference between the reflection maximum and the reflection minimum. In this way, the achievable reduction of the glaring effect by applying the control voltage will be particularly high. Furthermore, electrochromic elements suitable for use in vehicle rearview mirrors should in general have a particularly long service life, in view of their global duration of use and the number of switching cycles.

These requirements are fulfilled to a particularly high degree by an electrochromic element of so-called solid-state construction, known for example from DE 196 40 515 A1. In this electrochromic element, a multilayer system is applied on a transparent substrate, for example on a glass substrate, the multilayer system comprising an ion storage layer applied on a transparent solid-state electrolytic layer, which is applied to the substrate. On the latter, an electrochromic electrode layer is applied, which is covered by a reflective layer. With this construction, in particular a high reliability and operating-time stability can be achieved, which are necessary especially for applications in the area of motor vehicles. In order to guarantee at the same time a marked antiglare effect, a high reflection stroke is desirable especially for this type of electrochromic elements.

In such systems, like in a large number of other technical applications, it can be necessary or at least advantageous to produce at least one of the layers of the multilayer system with a certain porosity. The porosity is usually given according to the so-called Bruggemann model by the volume fraction of pores or spaces not filled with the material of the respective layer by an allocated percentage, a porosity of, for example, 30% according to this definition meaning a volume fraction ratio in the material of the respective layer/air of 70/30. Especially for applications in an electrochromic element of the above-mentioned type, for example the adjustment of a sufficiently high porosity in the solid-state electrolytic layer can be particularly favorable or desirable, as this may considerably favor the ionic conductivity of this layer and, therefore, the rearrangement processes necessary for the desired variability of the reflection or transmission characteristics.

It turned out, however, that in particular in multilayer systems of the above-mentioned type, in which at least one of the layers shall have a relatively high porosity, the adherence of adjacent layers on each other can be problematic. Especially when combining relatively porous layers with relatively compact layers, delaminations may occur in the multilayer system, impairing or jeopardizing the operativeness of the multilayer system as a whole. Such delaminations may also occur in the form of local damages in the respective interfaces between the individual layers, which may result, in particular already in the visual aspect, in grit-like appearances of the surface. It turned out that the adherence between adjacent layers can be improved by keeping the differences in porosity particularly low, which results, however, in a limitation of the possibilities of providing layers with the desired porosity.

This can lead to undesired limitations in the working or material characteristics of the multilayer systems produced in this way.

SUMMARY OF THE INVENTION

It is an object of the invention to provide a method for the production of a multilayer system of the above-mentioned type, in which at least one of the layers possesses a porosity generated by means of the vacuum coating process and which results in a particularly favorable adherence of the layers on each other. Furthermore, a method particularly appropriate for the production of an electrochromic element of the above-mentioned type shall be provided.

According to the invention, the layer applied first, or the solid-state electrolytic layer in case of production of the electrochromic element, is partially removed through an operation of ion etching, after its application and prior to the application of the other layer, in particular the electrochromic layer.

By ion etching, one understands in particular a treatment operation in which the layer to be treated is impacted, in a suitable atmosphere, by ions from an ion source, the interaction of the ions with the near-surface components of the respective layer effecting a delamination of such components from the surface areas of the layer. The ion etching operation is preferably carried out over the whole surface, i.e. in lateral direction over the entire layer.

Especially in the production of multilayer systems in which a relatively porous layer is produced immediately adjacent to relatively more compact layers, suitable means for adhesion promotion may be used to avoid the above-mentioned adhesion problems. In fact, so-called adhesion promotion concepts might be used, with which, for example through systematic adjustment of suitable gradients in the composition of the respective layer, suitable bonding properties can be achieved. It turned out, however, that such adhesion promotion concepts are relatively complicated and, therefore, expensive and lead, furthermore, to serious impairments of the respective material characteristics, at least locally. Therefore, to achieve the desired adhesion promotion in an alternative and simplified way, the surface of the already deposited layer should be pretreated in a way promoting the adhesion of the following layer. This pretreatment should be suitable in particular for depositing another layer on an already deposited relatively porous layer. Surprisingly, it turned out that a particularly favorable suitable pretreatment for the surface of such already deposited first layer, is an intermediate operation by which the already deposited layer is subjected to an ion etching operation.

Especially for the production of an electrochromic element, it can be particularly favorable to provide the solid-state electrolytic layer with a certain porosity of preferably at least 10%. Therefore, is particularly advantageous in the production of the electrochromic element to partly remove the solid-state electrolytic layer again, after its application, through the ion etching operation, before the electrochromic layer is applied by means of a following operation of a vacuum coating process.

When producing the electrochromic element, the multilayer system can comprise in particular the layer sequence ion storage layer—solid-state electrolytic layer—electrochromic layer or the layer sequence electrochromic layer—solid-state electrolytic layer—ion storage layer, so that the layer following the solid-state electrolytic layer is formed by the electrochromic layer or by the ion storage layer. Alternatively, the layer following the solid-state electrolytic layer may also be another electrolytic layer, for example one with reduced porosity.

To produce an electrochromic element suitable in particular for use in a vehicle mirror, a reflective layer, preferably of aluminium (Al), is advantageously applied on the layer applied last, i.e. in particular on the electrochromic layer or, in case of inverse layer sequence, on the ion storage layer.

The electrochromic electrode layer advantageously consists of a suitably selected electrochromic material, preferably of molybdenum oxide, titanium oxide, vanadium oxide, niobium oxide, chromium oxide, manganese oxide, iron oxide, cobalt oxide, nickel oxide, rhodium oxide, tantalum oxide, iridium oxide and/or, in a particularly advantageous embodiment, of tungsten oxide. In particular, these materials preferably exist in the form of stoichiometric or almost stoichiometric compounds according to $MoO_3$, $TiO_2$, $V_2O_5$, $Nb_2O_5$, $Cr_2O_3$, $MnO_2$, $FeO_2$, $CoO_2$, $NiO_2$, $RhO_2$, $Ta_2O_5$, $IrO_2$, $WO_3$. Particularly favorable working parameters can be achieved when the electrochromic electrode layer preferably has a thickness of approx. 270 nm for $WO_3$.

The solid-state electrolytic layer advantageously consists of zirconium oxide, silicon oxide, aluminium oxide, selenium oxide and/or preferably of tantalum oxide. For the solid-state electrolytic layer, advantageously a thickness of approx. 200 nm is selected. These materials also preferably exist in a stoichiometric or almost stoichiometric form as $ZrO_2$, $SiO_2$, $Al_2O_3$, $SnO_2$ or $Ta_2O_5$. To further increase the achievable reflection stroke, an ion storage layer is advantageously applied adjacent to the electrode layer. In a particularly advantageous embodiment, the ion storage layer is itself designed as an electrochromic electrode, whose transmission characteristics are also changed when the control voltage is applied. To form the electrochromic counter-electrode, preferably iridium oxide, iridium-magnesium oxide, nickel oxide, nickel-magnesium oxide, manganese oxide, cobalt oxide, titanium-vanadium oxide and/or preferably iridium-tantalum oxide is selected as material for the production of the ion storage layer, the ion storage layer advantageously having a thickness of approx. 100 nm.

The electrode layer is advantageously formed of indium-tin oxide (ITO) or Sb-doped zinc oxide ($SnO_2$:Sb) or Al-doped zinc oxide (ZnO:Al).

Advantageously, the intermediate operation of ion etching, provided for adhesion promotion, is carried out in such a way that the surface of the previously deposited layer is prepared over its entire surface, in view of a particularly efficient adhesion promotion, the volume of the applied layer being left unchanged to a particularly high extent, as far as its structure and other properties are concerned. To achieve a particularly favorable compromise between these two design targets, advantageously a share of the layer applied first of approx. 0.1% to approx. 1% is removed again through the ion etching operation.

Advantageously, the ion etching operation is effected in a working atmosphere of argon (Ar) and oxygen ($O_2$). In an additional or alternative advantageous development, an ion source operated with an accelerating voltage of approx. 2 kV to approx. 3 kV is used for the ion etching operation.

The advantages achieved with the invention consist in particular in the fact that through the intermediate ion etching operation provided between the application of two adjacent layers of the multilayer system, an efficient adhesion promotion is achievable between the adjacent layers in a particularly simple and efficient way, even if the porosities of these layers differ to a relatively significant degree. In this way, it is possible, maintaining in general a relatively high porosity of at least one of the layers, to produce, nevertheless, a mechanically particularly stable multilayer system with a relatively long service life. It is in particular possible in this way to deliberately produce porous layers of the multilayer system with a particularly high porosity, so that any favorable properties caused by this can be made use of in a particularly efficient way. Especially when used in electrochromic elements of the before-mentioned type, in particular the solid-state electrolyte can be produced with a relatively high porosity, so that in particular improved switching times can be achieved for the electrochromic element. Due to the increased porosity, the system can, furthermore, contain or absorb more water, so that in spite of the actually inevitable drying-out, a particularly long service life of the overall system can be achieved. In addition, multilayer systems produced in this way provide a particularly favorable layer adhesion, so that also due to the mechanical stability achievable in this way, a particularly long service life of the respective element can be achieved.

BRIEF DESCRIPTION OF THE DRAWING

An exemplary embodiment of the invention is explained in detail by means of the drawing, in which:

the FIGURE shows a cross-section of an electrochromic element.

DETAILED DESCRIPTION OF AN EXEMPLARY EMBODIMENT

The electrochromic element 1 according to the figure is provided in particular for application in a rearview mirror of a motor vehicle, other suitable applications, such as, for example, in switchable windows, canopy tops or the like, being also possible. The electrochromic element 1 is designed in the so-called solid-state construction and comprises a multilayer system 4 applied on a transparent substrate 2. As transparent substrate 2, a substrate made of glass is provided in the exemplary embodiment. As an essential functional component for making use of the phenomenon of electrochromism for a specific variation of its optical properties, the multilayer system 4 comprises an electrochromic layer 6 designed as an electrode layer, formed of a suitably selected electrochromic material, in the exemplary embodiment, tungsten oxide ($WO_3$). Alternatively, the electrochromic layer 6 could also be formed of another suitable electrochromic material which changes its properties of optical transmission when a control voltage is applied. The electrochromic electrode layer 6 is assigned, as counter-electrode, an ion storage layer 8, which is also formed of an electrochromic material, in the exemplary embodiment, iridium-tantalum oxide in fully oxidic or slightly sub-oxidic form, the percentages by mass (Ir:Ta) being, for example, approximately 30:70. Alternatively, another suitable electrochromic material, such as, for example, $IrO_2$, $NiO_2$, $MnO_2$, $CoO_2$, iridium-magnesium oxide, nickel-magnesium oxide and/or titanium-vanadium oxide, the latter in each case in fully oxidic or slightly sub-oxidic form with the percentages by mass of Ir:Mg being, for example, 30:70, of Ni:Mg being, for example, 50:50, or Ti:Va being, for example 40:60, could also be provided for forming the ion storage layer 8 as an electrochromic counter-electrode. The electrochromic layer 6 and the ion storage layer 8 include a transparent solid-state electrolytic layer 10 arranged between them, which in the exemplary embodiment is formed of tantalum oxide ($Ta_2O_5$). Alternatively, the solid-state electrolytic layer 10 could also be formed of another suitable material, such as, for example, $ZrO_2$, $SiO_2$, $Al_2O_3$, or $SnO_2$.

On its side facing away from the ion storage layer 8, the electrochromic layer 6 is covered by a reflective layer 12. On its side facing away from the electrochromic layer 6, the ion storage layer 8 is connected to the substrate 2 through another electrode layer 14 of indium-tin oxide (ITO) and an intermediate layer 16 of SiON.

Thus, the electrochromic element 1 includes the layer sequence substrate 2-intermediate layer 16—electrode layer 14—ion storage layer 8—solid-state electrolytic layer 10—electrochromic layer 6—reflective layer 12. In the exemplary embodiment, the following thicknesses have been chosen: for the intermediate layer 16, approx. 50 nm, for the further layer 14, approx. 200 nm, for the electrochromic electrode layer 6, approx. 270 nm, and for the porous reflective layer 12, approx. 80 nm.

The electrochromic element 1 is provided for use as an antiglare mirror whose reflection characteristics can be corrected as required. The sequence of layers in the multilayer system 4 guarantees that a light beam to be reflected passes first of all through the substrate 2 and then through the intermediate layer 16, the other electrode layer 14, the ion storage layer 8, the solid-state electrolytic layer 10 and through the electrochromic layer 6, before being reflected on the reflective layer 12. The reflected light beam then passes through the above-mentioned layers in reverse order, before leaving the electrochromic element 1 through the substrate 2. In unswitched state, the multilayer system 4 is designed for a relatively high transmissivity, so that altogether relatively high reflectances of, for example, approx. 70% can be achieved.

In case of need, i.e. when glaring for example of the driver through following vehicles shall be avoided, the reflectance of the electrochromic element 1 can, however, also be reduced by applying a control voltage between the electrochromic electrode layer 6 and the ion storage layer 8. For this purpose, the electrochromic layer 6 is switched as cathode and the ion storage layer 8, as anode. Through the applied voltage, water provided as a working medium in the electrochromic layer 6, in the solid-state electrolytic layer 10 and/or in the ion storage layer 8 dissociates into protons and hydroxide ions, the protons accumulating in the electrochromic layer 6 and the hydroxide ions, in the ion storage layer 8. This storage of the respective ions effects a turbidity and possibly coloring in the electrochromic layer 6 and in the ion storage layer 8, reducing the reflectance of the electrochromic element 1. When the control voltage is removed, protons and hydroxide ions recombine to water, so that the original state and thus the original reflectance of the electrochromic element 1 is re-established.

The electrochromic element 1 is designed for a particularly high so-called reflection stroke, i.e. a particularly great change of the reflectance as a function of the control voltage applied. To achieve this, the reflective layer 12 is porous and has a porosity which is sufficient for the penetration of water or water vapor. In the exemplary embodiment, the reflective layer 12 is made of aluminium (Al), having a porosity of approx. 30%. The reflective layer 12 is formed of crystallites of a mean size of approx. 30 nm.

The multilayer system 4 is applied on the substrate 2 in thin-film technology through a vacuum coating process. Particularly suitable production processes could be in that case electron-beam vapor deposition or also cathode sputtering. In the exemplary embodiment, the multilayer system 4 has been applied by means of cathode sputtering.

When producing the electrochromic element 1, first of all the intermediate layer 16, the other electrode layer 14, the ion storage layer 8, the solid-state electrolytic layer 10, and the electrochromic layer 6 are applied in the suitable order. The application of these layers is effected sequentially, choosing suitable operating parameters for the cathode-sputtering installation. The above-mentioned layers can be applied one immediately after the other or else with intermediate storage in a dry atmosphere (10% relative humidity). After application of the electrochromic layer 6, the reflective layer 12 is applied through cathode sputtering.

The electrochromic element 1 is specifically produced with a relatively high reflection stroke, so that through suitable selection of the solid-state electrolytic layer 10, a relatively great change of the transmission or reflection characteristics can be achieved. The electrochromic element 1 produced in this way is, therefore, particularly well suited for use as a rearview mirror in a motor vehicle, but also for other applications, such as, for example, in switchable windows, canopy tops, or the like. To guarantee the respective desired properties and, in particular, to particularly facilitate the rearrangement processes during ion storage in the solid-state electrolytic layer 10, which are necessary for this, the latter is produced with a relatively high porosity of more than 5% to maximally 30%, preferably more than 10% to maximally 20%.

Therefore, the electrochromic element 1 completed in this way includes a solid-state electrolytic layer 10 with a relatively high porosity, to which the electrochromic electrode layer 6 with relatively low porosity is immediately adjacent, in order to guarantee in this way the desired material properties and in particular the desired reflection stroke.

Such differences in porosity of immediately adjacent layers may, however, lead to serious problems of adhesion of the layers on each other, which might in particular lead to chippings or other impairments of the material of the individual layers and, therefore, to failures or a reduced service life of the electrochromic element 1. In order to safely avoid this with a relatively low expenditure, an adhesion promotion between the solid-state electrolytic layer 10 and the electrochromic layer 6 is provided. For this purpose, an intermediate operation is carried out during the production of the electrochromic element 1 between the application of the solid-state electrolytic layer 10 and the application of the electrochromic layer 6, whereby the solid-state electrolytic layer 10 is partly removed again after its application by means of an ion etching operation, by which in particular a share of approx. 0.1% to approx. 1% of the already applied thickness of the solid-state electrolytic layer 10 is removed again.

For this intermediate ion etching operation, the applied solid-state electrolytic layer 10 is treated with an ion source, for which in the exemplary embodiment, a linear etcher LIS38 of the supplier Advanced Energy can be used. The ion source generates Ar ions for etching, which through the accelerating voltage receive an energy of approx. 3 kV and impinge with this energy on the surface of the solid-state electrolytic layer 10. This effects a detachment of particles from the surface of the solid-state electrolytic layer 10, so that the latter is removed over a large surface. The ion etching operation is carried out in an $Ar/O_2$ atmosphere with an accelerating voltage of 2 kV to 3 kV and a sputter pressure between 0.1 Pa and 1 Pa. After this ion etching operation, the electrochromic electrode layer 6 can be applied, either immediately after the ion etching operation or else with a time delay, for example after storage in air for some days.

To compare the achievable properties, some variants of such electrochromic elements 1, namely of electrochromic mirrors, were produced under different conditions. In variant 1, the multilayer system 4 was produced through cathode sputtering, the solid-state electrolytic layer 10 being applied with a relatively low working or sputter pressure of 0.5 Pa. No ion etching operation was carried out in the production of variant 1. For producing variant 2, the solid-state electrolytic layer 10 was produced at a working or sputter pressure of 3 Pa, also without the intermediate ion etching operation, whereas variant 3 was produced with a working or sputter pressure of 3 Pa in the production of the solid-state electrolytic layer 10 with a following ion etching operation. The products or electrochromic elements 1 obtained in these variants were examined, on the one hand, with regard to the structural stability and adhesiveness of the multilayer system 4 and, on the other hand, with regard to the achievable reflection stroke and the associated switching times. To determine the adhesion properties, a tear-off test using an adhesive tape was carried out and afterwards, the surface of the torn-off layer was visually inspected and evaluated. Furthermore, in this context, the so-called grit formation, i.e. the lateral homogeneity of the layer system and its tendency to form different domains with different switching times, was taken into consideration, whereas the evaluation of the switching properties was based on the criterion that a change of the reflection characteristics of ⅔ of the total achievable reflection stroke should be achieved, if possible, within a switching time of 5 s, which is a common requirement in the automotive industry. Consequently, this switching time, within which the reflection of the element can be changed by ⅔ of the reflection stroke, was measured.

As a result, it was found that the samples produced with variant 1 have a non-porous solid-state electrolytic layer 10, due to the low sputter pressure. In these systems, a good stability of the multilayer system 4 is found, but the switching times of 10 s or more of these systems are unacceptably long. On the other hand, the samples produced with variant 2 have "good" switching times of typically less than 4 s, but the adhesion of the layers is insufficient. Only the samples produced with high sputter pressure according to variant 3 possess sufficiently porous solid-state electrolytic layers 10 and correspondingly favorable switching times of less than 4 s and at the same time very good adhesion properties of the multilayer system 4 as a whole.

What is claimed is:

1. A method of producing a multilayer system on a substrate comprising the steps of:
   applying a first and a second layer on the substrate, in each case using a vacuum coating process, at least one of the layers being applied so as to have a porosity generated by the vacuum coating process;
   partly removing the first layer using an ion etching operation after applying the first layer and before applying the second layer, wherein the partly removing includes removing approx. 0.1% to approx. 1% of the first layer.

2. The method as recited in claim 1, wherein the ion etching operation is carried out in a working atmosphere of argon and oxygen.

3. A method of producing a multilayer system on a substrate comprising the steps of:
   applying a first and a second layer on the substrate, in each case using a vacuum coating process, at least one of the layers being applied so as to have a porosity generated by the vacuum coating process;
   partly removing the first layer using an ion etching operation after applying the first layer and before applying the second layer, wherein the ion etching operation includes using an ion source operated with an accelerating voltage of approximately 2 kV to approximately 3 kV.

4. A method of producing a multilayer system on a substrate comprising the steps of:

applying a first and a second layer on the substrate, in each case using a vacuum coating process, at least one of the layers being applied so as to have a porosity generated by the vacuum coating process;

partly removing the first layer using an ion etching operation after applying the first layer and before applying the second layer, further comprising applying an ion storage layer to the substrate before applying the first layer, and wherein the first layer is a transparent solid-state electrolytic layer, the second layer is an electrochromic layer, and the substrate is transparent.

5. The method as recited in claim 4, further comprising applying a reflective layer on the electrochromic layer.

6. The method as recited in claim 5, wherein the reflective layer includes aluminium.

7. The method as recited in claim 4, wherein the electrochromic layer includes at least one of molybdenum oxide, titanium oxide, vanadium oxide, niobium oxide, chromium oxide, manganese oxide, iron oxide, cobalt oxide, nickel oxide, rhodium oxide, tantalum oxide, iridium oxide and tungsten oxide.

8. The method as recited in claim 4, wherein the solid-state electrolytic layer includes at least one of zirconium oxide, silicon oxide, aluminium oxide, selenium oxide and tantalum oxide.

9. The method as recited in claim 4, wherein the ion storage layer includes a further electrochromic layer.

10. The method as recited in claim 4, wherein the ion storage layer includes at least one of iridium oxide, iridium-magnesium oxide, nickel oxide, nickel-magnesium oxide, manganese oxide, cobalt oxide, titanium-vanadium oxide and iridium-tantalum oxide.

11. The method as recited in claim 4, further comprising applying an electrode layer adjacent to the ion storage layer.

12. The method as recited in claim 11, wherein the electrode layer includes at least one of indium-tin oxide and Sb-doped tin oxide, and Al-doped zinc oxide.

13. The method as recited in claim 4, wherein the multi-layer system is an electrochromic element.

14. The method as recited in claim 1, wherein the at least one layer having a porosity is the first layer.

15. The method as recited in claim 3, wherein the at least one layer having a porosity is the first layer.

16. The method as recited in claim 4, wherein the at least one layer having a porosity is the first layer.

17. The method as recited in claim 3, wherein the ion etching operation is carried out in a working atmosphere of argon and oxygen.

18. The method as recited in claim 4, wherein the ion etching operation is carried out in a working atmosphere of argon and oxygen.

* * * * *